US010429909B2

(12) United States Patent
Goh et al.

(10) Patent No.: US 10,429,909 B2
(45) Date of Patent: Oct. 1, 2019

(54) MANAGING POWER IN A HIGH PERFORMANCE COMPUTING SYSTEM FOR RESILIENCY AND COOLING

(71) Applicant: HEWLETT PACKARD ENTERPRISE DEVELOPMENT LP, Houston, TX (US)

(72) Inventors: Eng Lim Goh, Serangoon (SG); Patrick Donlin, Deephaven, MN (US); Andrew Warner, Edina, MN (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/148,242

(22) Filed: May 6, 2016

(65) Prior Publication Data

US 2016/0349812 A1    Dec. 1, 2016

Related U.S. Application Data

(60) Provisional application No. 62/169,058, filed on Jun. 1, 2015.

(51) Int. Cl.
*G06F 1/20* (2006.01)
*G06F 11/07* (2006.01)
(Continued)

(52) U.S. Cl.
CPC .............. *G06F 1/206* (2013.01); *G06F 11/00* (2013.01); *G06F 11/0793* (2013.01); *G06F 1/324* (2013.01); *Y02D 10/126* (2018.01)

(58) Field of Classification Search
CPC ............. G06F 11/0709; G06F 11/0724; G06F 11/0793; G06F 11/3058; G06F 1/20–206; G06F 2200/201
See application file for complete search history.

(56) References Cited

U.S. PATENT DOCUMENTS 6,216,235 B1 * 4/2001 Thomas ................. G06F 1/206
    713/501
6,647,320 B1 * 11/2003 Inoue ..................... G06F 1/206
    361/695

(Continued)

FOREIGN PATENT DOCUMENTS

WO   WO 2011/077103 A1   6/2011   ............. G06F 15/80
WO   WO-2016182851       11/2016

OTHER PUBLICATIONS

Fourestey et al., "First Experiences With Validating and Using the Cray Power Management Database Tool", Cornell University Library, paper was presented at the 2014 Cray User Group (CUG) user meeting in Lugano, Switzerland,, 7 pages, dated Aug. 12, 2014.

(Continued)

*Primary Examiner* — Joseph R Kudirka

(57) ABSTRACT

An apparatus and method thermally manage a high performance computing system having a plurality of nodes with microprocessors. To that end, the apparatus and method monitor the temperature of at least one of a) the environment of the high performance computing system and b) at least a portion of the high performance computing system. In response, the apparatus and method control the processing speed of at least one of the microprocessors on at least one of the plurality of nodes as a function of at least one of the monitored temperatures.

18 Claims, 9 Drawing Sheets

(51) Int. Cl.
*G06F 11/00* (2006.01)
*G06F 1/324* (2019.01)

(56) References Cited

U.S. PATENT DOCUMENTS

| | | | |
|---|---|---|---|
| 7,210,048 B2 | 4/2007 | Bodas | |
| 7,310,737 B2* | 12/2007 | Patel | G06F 1/20 713/300 |
| 7,596,638 B2* | 9/2009 | Lee | G06F 1/206 710/18 |
| 7,886,164 B1 | 2/2011 | Alben | |
| 8,132,031 B2* | 3/2012 | Barsness | G06F 1/3203 709/226 |
| 8,141,374 B2* | 3/2012 | Hay | G06F 1/20 62/171 |
| 8,214,658 B2* | 7/2012 | Casey | G06F 1/206 713/300 |
| 8,250,133 B2 | 8/2012 | Blumrich et al. | 709/201 |
| 8,601,287 B1 | 12/2013 | Weber et al. | 713/300 |
| 8,972,702 B2 | 3/2015 | Banerjee et al. | 712/220 |
| 10,156,987 B1* | 12/2018 | Gutierrez | G06F 11/3058 |
| 2004/0268166 A1 | 12/2004 | Farkas et al. | |
| 2008/0256371 A1 | 10/2008 | Diab et al. | 713/300 |
| 2009/0077396 A1 | 3/2009 | Tsai, Jr. | |
| 2010/0235003 A1 | 9/2010 | Maly | 700/276 |
| 2010/0306598 A1* | 12/2010 | Ackaret | G06F 11/073 714/47.1 |
| 2011/0131425 A1 | 6/2011 | Banerjee et al. | 713/300 |
| 2011/0289329 A1 | 11/2011 | Bose et al. | 713/320 |
| 2012/0110352 A1* | 5/2012 | Branover | G06F 1/206 713/300 |
| 2012/0110360 A1 | 5/2012 | Lin et al. | 713/324 |
| 2012/0260118 A1 | 10/2012 | Jiang et al. | 713/340 |
| 2013/0024708 A1 | 1/2013 | Goodrum | |
| 2013/0103929 A1 | 4/2013 | Ballew et al. | 712/42 |
| 2013/0139896 A1 | 6/2013 | Archer et al. | |
| 2013/0226362 A1 | 8/2013 | Jagadishprasad | |
| 2013/0232346 A1* | 9/2013 | Wu | G06F 1/3228 713/300 |
| 2013/0318371 A1 | 11/2013 | Hormuth | |
| 2014/0047342 A1 | 2/2014 | Breternitz | |
| 2014/0143558 A1 | 5/2014 | Kuesel et al. | 713/300 |
| 2015/0019971 A1 | 1/2015 | Fahimi | |
| 2015/0146593 A1 | 5/2015 | Patil et al. | H04W 52/0225 |

OTHER PUBLICATIONS

International Searching Authority, International Search Report—Application No. PCT/US2016/031001, dated Nov. 6, 2016, together with the Written Opinion of the International Searching Authority, 14 pages.

Extended European Search Report received in EP Application No. 16793222.7, dated Mar. 19, 2018, 10 pages.

* cited by examiner

MANAGING POWER IN A HIGH PERFORMANCE COMPUTING SYSTEM FOR RESILIENCY AND COOLING

PRIORITY

This patent application claims priority from provisional U.S. patent application No. 62/169,058, filed Jun. 1, 2015, entitled, "MANAGING POWER IN A HIGH PERFORMANCE COMPUTING SYSTEM FOR ERROR AVOIDANCE AND COOLING," and naming Eng Lim Goh as inventor, the disclosure of which is incorporated herein, in its entirety, by reference.

RELATED PATENT APPLICATIONS

This patent application is related to U.S. patent application Ser. No. 14/709,201, filed May 11, 2015, entitled, "METHOD AND APPARATUS FOR MANAGING NODAL POWER IN A HIGH PERFORMANCE COMPUTER SYSTEM," and naming Patrick Donlin and Andrew Warner as inventors, the disclosure of which is incorporated herein, in its entirety, by reference.

FIELD OF THE INVENTION

The invention generally relates to high performance computing systems and, more particularly, the invention relates to managing power in a high performance computing system.

BACKGROUND OF THE INVENTION

In distributed processing systems, multiple processors communicate with each other and with memory devices to perform a shared computation. Because the types of computations involved are generally very complex or require a great deal of processing power, this type of communication often must be very high speed.

High-performance computing ("HPC") systems further increase speed by using specialized hardware that is not generally available commercially off-the-shelf for use in, for example, desktop or server computers. This specialized hardware often includes a plurality of computing nodes having customized application-specific integrated circuits ("ASICs") with a number of communications channels for communicating with other ASICS on other nodes (and components on the same node). Such hardware also includes the processors, memory, and other specialized hardware unique to implement a tightly-coupled HPC system. HPC systems thus often divide execution of complex computations across multiple of these interconnected nodes.

HPC systems produce significant amounts of heat. As such, proper cooling is important to their effective functioning. HPC systems also are prone to error conditions that can impair their ability to complete a task.

SUMMARY OF VARIOUS EMBODIMENTS

In accordance with one embodiment of the invention, an apparatus and method thermally manage a high performance computing system having a plurality of nodes with microprocessors. To that end, the apparatus and method monitor the temperature of at least one of a) the environment of the high performance computing system and b) at least a portion of the high performance computing system. In response, the apparatus and method control the processing speed of at least one of the microprocessors on at least one of the plurality of nodes as a function of at least one of the monitored temperatures.

The high performance computing system may be located within a room having an air temperature. In that case, the environment may include a region of the room (e.g., the region near the computer system), and the monitored temperature may include the air temperature at the region of the room. Alternatively or additionally, the method may monitor at least one of microprocessors, memory, and power supplies of at least one of the nodes of the high performance computing system.

Among other ways, the temperature may be monitored by monitoring the temperature of both a) the environment of the high performance computing system and b) at least the portion of the high performance computing system. In that case, the method and apparatus may control the processing speed of at least one of the microprocessors on at least one of the plurality of nodes as a function of both the monitored temperatures (a) and (b).

Various embodiments control processor speeds based on a number of variables. For example, the method and apparatus may reduce the processing speed of the at least one microprocessor for a prescribed period of time, and then increase the speed of the at least one microprocessor after the prescribed period of time has elapsed. As another example, the method and apparatus may reduce the processing speed at least until the monitored temperature decreases to a prescribed temperature, and then increase the processing speed after the monitored temperature has decreased to the prescribed temperature.

To cool the nodes, the high performance computing system may include a coil configured selectively to be convectively cooled with a dry cooling system and/or be conductively cooled with a wet cooling system. With such a system, the method and apparatus may reduce the processing speed to a lower speed in response to the monitored temperature, and cool the coil with the dry cooling system after first reducing. Next, after reducing the processing speed and using the dry cooling system, the method may cool the coil with the wet cooling system after the monitored temperature exceeds a prescribed amount. The processing speed at this point preferably is no greater than the lower speed when using the wet cooling system. Thus, in this example, the dry cooling system may not have been able to cool the coil sufficiently given certain performance parameters, which caused it to switch to the wet cooling system. Reducing the processing speed may, in some cases, eliminate the need for the wet cooling system so long as the monitored temperature remains at a prescribed level.

The noted cooling system thus may be considered to cool in a plurality of modes—a lower cooling mode and a higher cooling mode. To conserve water, the method and apparatus may determine the cooling capacity of the lower cooling mode, and control/vary the processing speed of the at least one microprocessor to maintain the cooling system in the lower cooling mode. Among other ways, the method and apparatus may determine the cooling capacity by monitoring the temperature of at least a portion of the high performance computing system.

In accordance with another embodiment, an apparatus for thermally managing a high performance computing system has a temperature sensor configured to monitor the temperature of at least one of a) the environment of the high performance computing system and b) at least a portion of the high performance computing system. In a manner similar to prior embodiments discussed above, the high performance computing system has a plurality of nodes with microprocessors. The apparatus also has a processor controller operatively coupled with the temperature monitor. The processor controller is configured to control the processing speed of one of the microprocessors on at least one of the plurality of nodes as a function of at least one of the monitored temperatures.

In accordance with other embodiments, a method and apparatus manages errors in a high performance computing system having a plurality of nodes with microprocessors. To that end, the method and apparatus detect a prescribed error condition of the high performance computing system, and reduce the processing speed of at least one of the microprocessors on at least one of the plurality of nodes after detecting the prescribed error condition.

The prescribed error condition may include at least one of a correctable error and a temperature reading of at least one of the nodes. For example, the correctable error may include at least one of a memory correctable error and a network correctable error. Moreover, the method and apparatus may permit the processing speed to maintain current levels (i.e., the normal processing speed as specified by the system and the microprocessor) and then reduce the processing speed from current levels after detecting a prescribed plurality of prescribed error conditions.

In some embodiments, the method and apparatus may detect a plurality of error conditions of the high performance computing system, and then reduce the processing speed as a function of the number of error conditions. To correct the error, various embodiments may hot swap at least a portion of the high performance computing system, or stop execution of at least a portion of the high performance computing system. In some instances, while a given node executes a task, the method and apparatus may detect an error condition on the given node, and postpone reduction of the processing speed until after the task is completed.

In accordance with still other embodiments, an apparatus for managing errors in a high performance computing system having a plurality of nodes with microprocessors has an error checker configured to detect a prescribed error condition of the high performance computing system. In addition, the apparatus also has a processor controller operatively coupled with the error checker. The processor controller is configured to reduce the processing speed of at least one of the microprocessors on at least one of the plurality of nodes after detecting the prescribed error condition.

In accordance with yet other embodiments, a method and apparatus thermally manage a high performance computing system having a plurality of nodes with microprocessors, and a cooling system for cooling the plurality of the nodes. To that end, the method and apparatus first detect a malfunction in the cooling system, and responsively reduce the processing speed of at least one of the microprocessors to a non-zero rate on at least one of the plurality of nodes after detecting the malfunction.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS s Illustrative embodiments manage power of the nodes in a high-performance computing system as a function of various environmental and/or performance criteria. To that end, in one embodiment, a processor controller selectively reduces the power usage of one or more nodes to reduce water consumption required by a wet cooling system or a hybrid cooling system. When controlled appropriately, such embodiments may mitigate or substantially eliminate the need for wet cooling systems and, in some instances, expensive chillers. In fact, related embodiments may reduce power usage if it detects a malfunction in the cooling system itself. Accordingly, if the cooling system is unable to adequately cool the system, the processor controller may reduce power consumption to mitigate the chance of system overheating.

In another embodiment, after detecting error conditions in a high-performance computing system, a processor controller reduces the processing speed of one or more of its nodes. For example, the controller may permit some or all currently executing processes to conclude (or reach an appropriate stopping point) before shutting down some or all of the system for service, or performing a hot-swapping operation. While enabling processes to conclude or reach an appropriate stopping point, reducing the processing speed should increase the likelihood that the system does not fail before it can be serviced. This controlled reduction in speed to an ultimate service helps maintain the resiliency and efficiency of the system.

In other embodiments, an application program executing on a high performance computing system dynamically varies its permitted power range. To that end, using information related to a plurality of nodes in the system, a central controller sets an initial power range for the system. The application, which is configured to execute on a subset of the plurality of nodes (i.e., it executes on one or more nodes of the system), also initially is intended to follow this initial power range. In response to changing or unique requirements, however, the application program can request a new/different power range for its nodes. In fact, the application program can request this different power range even before receiving the initial power range.

The central controller of this latter embodiment thus may change the power range of the one or more nodes executing the application program. As such, one or more nodes subsequently use that new power range to execute the processes required by the application program. Such dynamic power control can more efficiently coordinate power usage and processing among the plurality of nodes in the system, effectively improving overall system performance.

Details of these and other embodiments are discussed below.

System Architecture

Figure 1:
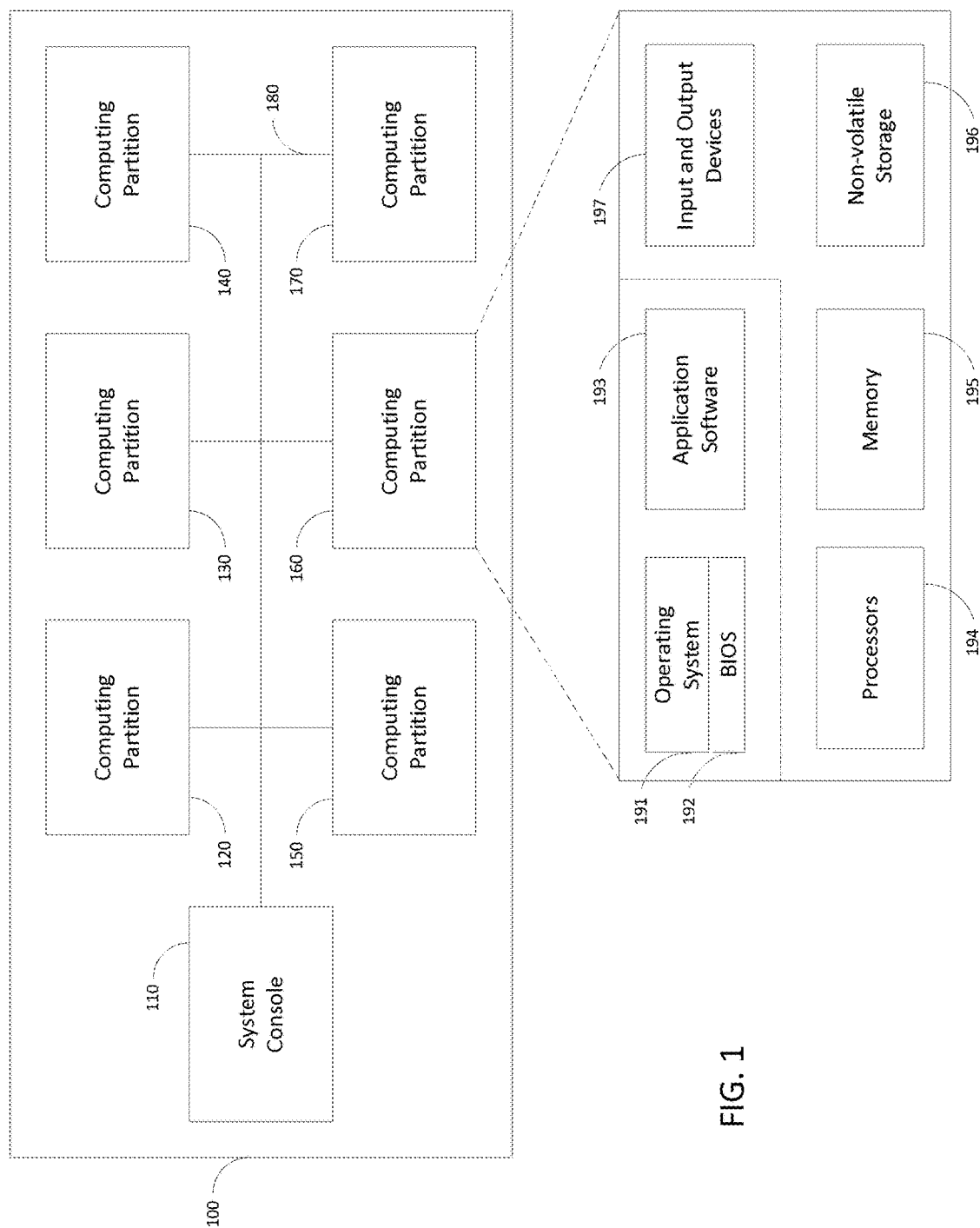
FIG. 1 schematically shows a logical view of an HPC system in accordance with one embodiment of the present invention.

FIG. 1 schematically shows a logical view of an exemplary high-performance computing system 100 that may be used with illustrative embodiments of the present invention. Specifically, as known by those in the art, a "high-performance computing system," or "HPC system," is a computing system having a plurality of modular computing resources that are tightly coupled using hardware interconnects, so that processors may access remote data directly using a common memory address space.

The HPC system 100 includes a number of logical computing partitions 120, 130, 140, 150, 160, 170 for providing computational resources, and a system console 110 for managing the plurality of partitions 120-170. A "computing partition" (or "partition") in an HPC system is an administrative allocation of computational resources that runs a single operating system instance and has a common memory address space. Partitions 120-170 may communicate with the system console 110 using a logical communication network 180. A system user, such as a scientist or engineer who desires to perform a calculation, may request computational resources from a system operator, who uses the system console 110 to allocate and manage those resources. Allocation of computational resources to partitions is described below. The HPC system 100 may have any number of computing partitions that are administratively assigned as described in more detail below, and often has only one partition that encompasses all of the available computing resources. Accordingly, this figure should not be seen as limiting the scope of the invention.

Each computing partition, such as partition 160, may be viewed logically as if it were a single computing device, akin to a desktop computer. Thus, the partition 160 may execute software, including a single operating system ("OS") instance 191 that uses a basic input/output system ("BIOS") 192 as these are used together in the art, and application software 193 for one or more system users.

Accordingly, as also shown in FIG. 1, a computing partition has various hardware allocated to it by a system operator, including one or more processors 194, volatile memory 195, non-volatile storage 196, and input and output ("I/O") devices 197 (e.g., network ports, video display devices, keyboards, and the like). However, in HPC systems like the embodiment in FIG. 1, each computing partition has a great deal more processing power and memory than a typical desktop computer. The OS software may include, for example, a Windows® operating system by Microsoft Corporation of Redmond, Wash., or a Linux operating system. Moreover, although the BIOS may be provided as firmware by a hardware manufacturer, such as Intel Corporation of Santa Clara, Calif., it is typically customized according to the needs of the HPC system designer to support high-performance computing, as described below in more detail.

As part of its system management role, the system console 110 acts as an interface between the computing capabilities of the computing partitions 120-170 and the system operator or other computing systems. To that end, the system console 110 issues commands to the HPC system hardware and software on behalf of the system operator that permit, among other things: 1) booting the hardware, 2) dividing the system computing resources into computing partitions, 3) initializing the partitions, 4) monitoring the health of each partition and any hardware or software errors generated therein, 5) distributing operating systems and application software to the various partitions, 6) causing the operating systems and software to execute, 7) backing up the state of the partition or software therein, 8) shutting down application software, and 9) shutting down a computing partition or the entire HPC system 100. These particular functions are described in more detail in the section below entitled "System Operation."

Figure 2:
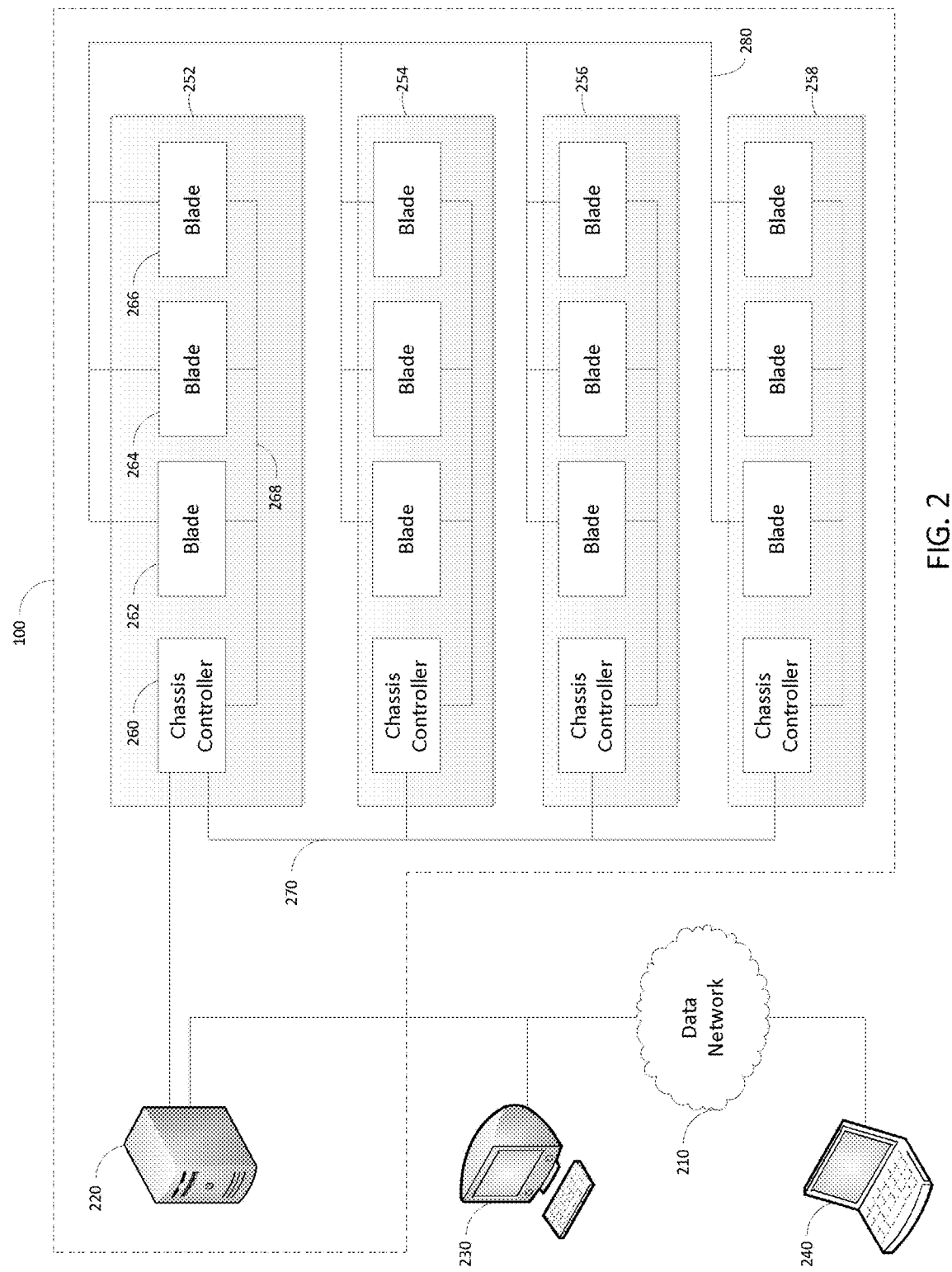
FIG. 2 schematically shows a physical view of the HPC system of FIG. 1.

FIG. 2 schematically shows a physical view of a high performance computing system 100 in accordance with the embodiment of FIG. 1. The hardware that comprises the HPC system 100 of FIG. 1 is surrounded by the dashed line. The HPC system 100 is connected to a customer data network 210 to facilitate customer access.

The HPC system 100 includes a system management node ("SMN") 220 that performs the functions of the system console 110. The management node 220 may be implemented as a desktop computer, a server computer, or other similar computing device, provided either by the customer or the HPC system designer, and includes software necessary to control the HPC system 100 (i.e., the system console software).

The HPC system 100 is accessible using the data network 210, which may include any data network known in the art, such as a customer local area network ("LAN"), a virtual private network ("VPN"), the Internet, or the like, or a combination of these networks. Any of these networks may permit a number of users to access the HPC system resources remotely and/or simultaneously. For example, the management node 220 may be accessed by a customer computer 230 by way of remote login using tools known in the art such as Windows® Remote Desktop Services or the UNIX secure shell. If the customer is so inclined, access to the HPC system 100 may be provided to a remote computer 240. The remote computer 240 may access the HPC system by way of a login to the management node 220 as just described, or using a gateway or proxy system as is known to persons in the art.

The hardware computing resources of the HPC system 100 (e.g., the processors, memory, non-volatile storage, and I/O devices shown in FIG. 1) are provided collectively by one or more "blade chassis," such as blade chassis 252, 254, 256, 258 shown in FIG. 2, that are managed and allocated into computing partitions. A blade chassis is an electronic chassis that is configured to house, power, and provide high-speed data communications between a plurality of stackable, modular electronic circuit boards called "blades." Each blade includes enough computing hardware to act as a standalone computing server. The modular design of a blade chassis permits the blades to be connected to power and data lines with a minimum of cabling and vertical space.

Accordingly, each blade chassis, for example blade chassis 252, has a chassis management controller 260 (also referred to as a "chassis controller" or "CMC") for managing system functions in the blade chassis 252, and a number of blades 262, 264, 266 for providing computing resources. Each blade, for example blade 262, contributes its hardware computing resources to the collective total resources of the HPC system 100. The system management node 220 manages the hardware computing resources of the entire HPC system 100 using the chassis controllers, such as chassis controller 260, while each chassis controller in turn manages the resources for just the blades in its blade chassis. The chassis controller 260 is physically and electrically coupled to the blades 262-266 inside the blade chassis 252 by means of a local management bus 268, described below in more detail. The hardware in the other blade chassis 254-258 is similarly configured.

The chassis controllers communicate with each other using a management connection 270. The management connection 270 may be a high-speed LAN, for example, running an Ethernet communication protocol, or other data bus. By contrast, the blades communicate with each other using a computing connection 280. To that end, the computing connection 280 illustratively has a high-bandwidth, low-latency system interconnect, such as NumaLink, developed by Silicon Graphics International Corp. of Milpitas, Calif.

The chassis controller 260 provides system hardware management functions to the rest of the HPC system. For example, the chassis controller 260 may receive a system boot command from the SMN 220, and respond by issuing boot commands to each of the blades 262-266 using the local management bus 268. Similarly, the chassis controller 260 may receive hardware error data from one or more of the blades 262-266 and store this information for later analysis in combination with error data stored by the other chassis controllers. In some embodiments, such as that shown in FIG. 2, the SMN 220 or a customer computer 230 are provided access to a single, master chassis controller 260 that processes system management commands to control the HPC system 100 and forwards these commands to the other chassis controllers. In other embodiments, however, an SMN 220 is coupled directly to the management connection 270 and issues commands to each chassis controller individually. Persons having ordinary skill in the art may contemplate variations of these designs that permit the same type of functionality, but for clarity only these designs are presented.

The blade chassis 252, its blades 262-266, and the local management bus 268 may be provided as known in the art. However, the chassis controller 260 may be implemented using hardware, firmware, or software provided by the HPC system designer. Each blade provides the HPC system 100 with some quantity of processors, volatile memory, non-volatile storage, and I/O devices that are known in the art of standalone computer servers. However, each blade also has hardware, firmware, and/or software to allow these computing resources to be grouped together and treated collectively as computing partitions, as described below in more detail in the section entitled "System Operation."

While FIG. 2 shows an HPC system 100 having four chassis and three blades in each chassis, it should be appreciated that these figures do not limit the scope of the invention. An HPC system may have dozens of chassis and hundreds of blades; indeed, HPC systems often are desired because they provide very large quantities of tightly-coupled computing resources.

Figure 3:
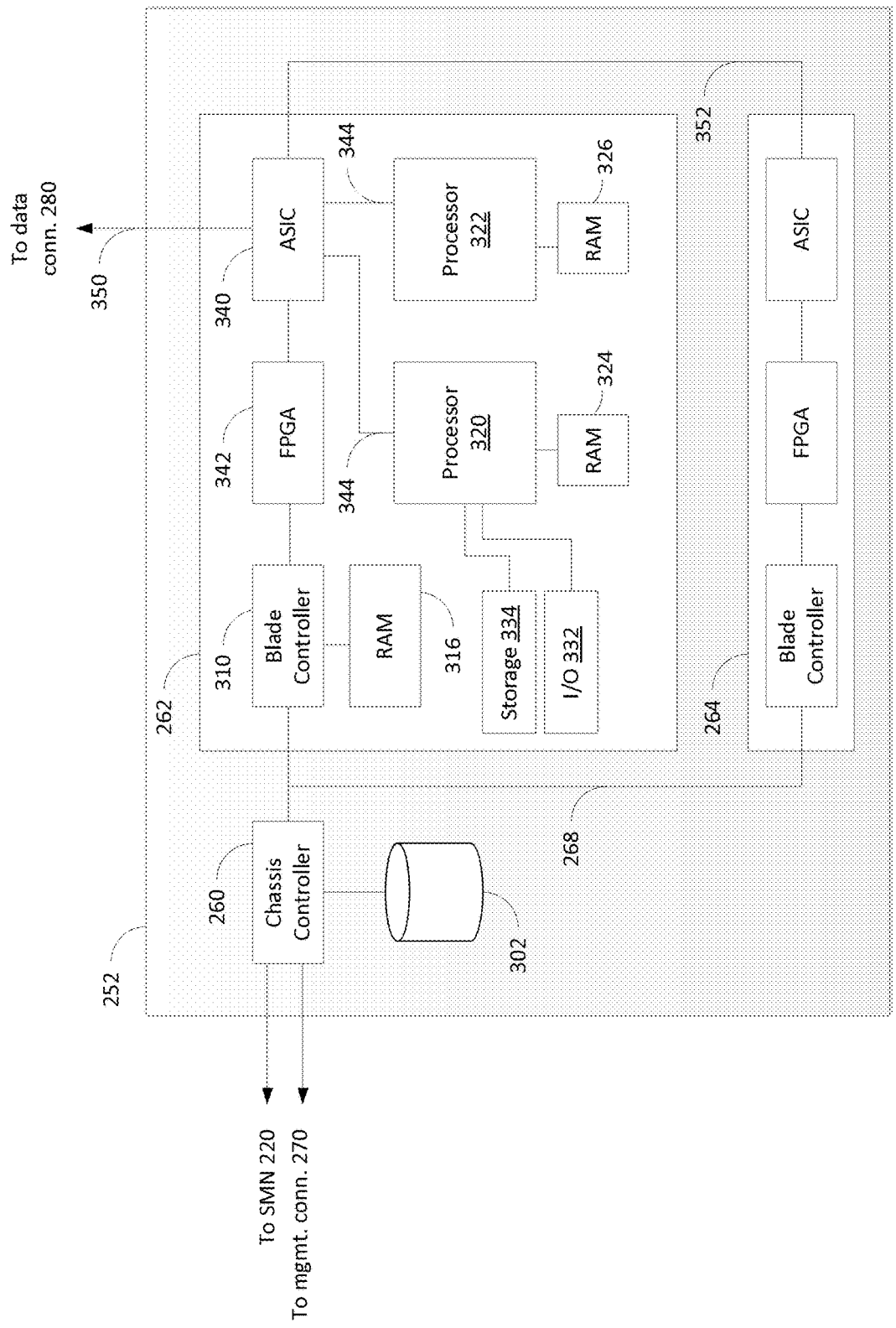
FIG. 3 schematically shows details of a blade chassis of the HPC system of FIG. 1.

FIG. 3 schematically shows a single blade chassis 252 in more detail. In this figure, parts not relevant to the immediate description have been omitted. The chassis controller 260 is shown with its connections to the system management node 220 and to the management connection 270. The chassis controller 260 may be provided with a chassis data store 302 for storing chassis management data. In some embodiments, the chassis data store 302 is volatile random access memory ("RAM"), in which case data in the chassis data store 302 are accessible by the SMN 220 so long as power is applied to the blade chassis 252, even if one or more of the computing partitions has failed (e.g., due to an OS crash) or a blade has malfunctioned. In other embodiments, the chassis data store 302 is non-volatile storage such as a hard disk drive ("HDD") or a solid state drive ("SSD"). In these embodiments, data in the chassis data store 302 are accessible after the HPC system has been powered down and rebooted.

FIG. 3 shows relevant portions of specific implementations of the blades 262 and 264 for discussion purposes. The blade 262 includes a blade management controller 310 (also called a "blade controller" or "BMC") that executes system management functions at a blade level, in a manner analogous to the functions performed by the chassis controller at the chassis level. For more detail on the operations of the chassis controller and blade controller, see the section entitled "HPC System Operation" below. The blade controller 310 may be implemented as custom hardware, designed by the HPC system designer to permit communication with the chassis controller 260. In addition, the blade controller 310 may have its own RAM 316 to carry out its management functions. The chassis controller 260 communicates with the blade controller of each blade using the local management bus 268, as shown in FIG. 3 and the previous figures.

The blade 262 also includes one or more microprocessors 320, 322 (alternatively referred to as "processors 320 or 322" or generically referred to as "processors 320") that are connected to RAM 324, 326. Blade 262 may be alternately configured so that multiple processors may access a common set of RAM on a single bus, as is known in the art. It should also be appreciated that processors 320, 322 may include any number of central processing units ("CPUs") or cores, as is known in the art. The processors 320, 322 in the blade 262 are connected to other items, such as a data bus that communicates with I/O devices 332, a data bus that communicates with non-volatile storage 334, and other buses commonly found in standalone computing systems. (For clarity, FIG. 3 shows only the connections from processor 320 to these other devices.) The processors 320, 322 may be, for example, Intel® Core™ processors manufactured by Intel Corporation. The I/O bus may be, for example, a PCI or PCI Express ("PCIe") bus. The storage bus may be, for example, a SATA, SCSI, or Fibre Channel bus. It will be appreciated that other bus standards, processor types, and processor manufacturers may be used in accordance with illustrative embodiments of the present invention.

Each blade (e.g., the blades 262 and 264) includes an application-specific integrated circuit 340 (also referred to as an "ASIC", "hub chip", or "hub ASIC") that controls much of its functionality. More specifically, to logically connect the processors 320, 322, RAM 324, 326, and other devices 332, 334 together to form a managed, multi-processor, (optionally) coherently-shared distributed-memory HPC system, the processors 320, 322 are electrically connected to the hub ASIC 340. The hub ASIC 340 thus provides an interface between the HPC system management functions generated by the SMN 220, chassis controller 260, and blade controller 310, and the computing resources of the blade 262.

In this connection, the hub ASIC 340 connects with the blade controller 310 either through a direct connection, or by way of a field-programmable gate array ("FPGA") 342 or similar programmable device for passing signals between integrated circuits. Those skilled in the art can select the appropriate connection between the hub ASIC 340 and the blade controller 310. Discussion of the direct connection or indirect connection should not limit various embodiments of the invention.

In particular, signals are generated on output pins of the blade controller 310, in response to commands issued by the chassis controller 260. In the indirect connection case, these signals are translated by the FPGA 342 into commands for certain input pins of the hub ASIC 340, and vice versa. For example, a "power on" signal received by the blade controller 310 from the chassis controller 260 requires, among other things, providing a "power on" voltage to a certain pin on the hub ASIC 340; the FPGA 342 facilitates this task.

The field-programmable nature of the FPGA 342 permits the interface between the blade controller 310 and ASIC 340 to be reprogrammable after manufacturing. Thus, for example, the blade controller 310 and ASIC 340 may be designed to have certain generic functions, and the FPGA 342 may be used advantageously to program the use of those functions in an application-specific way. The communications interface between the blade controller 310 and ASIC 340 also may be updated if a hardware design error is discovered in either module, permitting a quick system repair without requiring new hardware to be fabricated.

Also in connection with its role as the interface between computing resources and system management, the hub ASIC 340 is connected to the processors 320, 322 by way of a high-speed processor interconnect 344. In one embodiment, the processors 320, 322 are manufactured by Intel Corporation which provides the Intel® QuickPath Interconnect ("QPI") for this purpose, and the hub ASIC 340 includes a module for communicating with the processors 320, 322 using QPI. Other embodiments may use other processor interconnect configurations.

The hub chip 340 in each blade also provides connections to other blades for high-bandwidth, low-latency data communications. Thus, the hub chip 340 includes a link 350 to the computing connection 280 that connects different blade chassis. This link 350 may be implemented using networking cables, for example. The hub ASIC 340 also includes connections to other blades in the same blade chassis 252. The hub ASIC 340 of blade 262 connects to the hub ASIC 340 of blade 264 by way of a chassis computing connection 352. The chassis computing connection 352 may be implemented as a data bus on a backplane of the blade chassis 252 rather than using networking cables, advantageously allowing the very high speed data communication between blades that is required for high-performance computing tasks. Data communication on both the inter-chassis computing connection 280 and the intra-chassis computing connection 352 may be implemented using the NumaLink protocol or a similar protocol.

HPC System Operation

System management commands generally propagate from the SMN 220, through the management connection 270 to the blade chassis (and their chassis controllers), then to the blades (and their blade controllers), and finally to the hub ASICS that implement the commands using the system computing hardware.

As a concrete example, consider the process of powering on an HPC system. In accordance with exemplary embodiments, the HPC system 100 is powered when a system operator issues a "power on" command from the SMN 220. The SMN 220 propagates this command to each of the blade chassis 252-258 by way of their respective chassis controllers, such as chassis controller 260 in blade chassis 252. Each chassis controller, in turn, issues a "power on" command to each of the respective blades in its blade chassis by way of their respective blade controllers, such as blade controller 310 of blade 262. Blade controller 310 issues a "power on" command to its corresponding hub chip 340 using the FPGA 342, which provides a signal on one of the pins of the hub chip 340 that allows it to initialize. Other commands propagate similarly.

Once the HPC system is powered on, its computing resources may be divided into computing partitions. The quantity of computing resources that are allocated to each computing partition is an administrative decision. For example, a customer may have a number of projects to complete, and each project is projected to require a certain amount of computing resources. Different projects may require different proportions of processing power, memory, and I/O device usage, and different blades may have different quantities of the resources installed. The HPC system administrator takes these considerations into account when partitioning the computing resources of the HPC system 100. Partitioning the computing resources may be accomplished by programming each blade's RAM 316. For example, the SMN 220 may issue appropriate blade programming commands after reading a system configuration file.

The collective hardware computing resources of the HPC system 100 may be divided into computing partitions according to any administrative need. Thus, for example, a single computing partition may include the computing resources of some or all of the blades of one blade chassis 252, all of the blades of multiple blade chassis 252 and 254, some of the blades of one blade chassis 252 and all of the blades of blade chassis 254, all of the computing resources of the entire HPC system 100, and other similar combinations. Hardware computing resources may be partitioned statically, in which case a reboot of the entire HPC system 100 is required to reallocate hardware. Alternatively and preferentially, hardware computing resources are partitioned dynamically while the HPC system 100 is powered on. In this way, unallocated resources may be assigned to a partition without interrupting the operation of other partitions.

It should be noted that once the HPC system 100 has been appropriately partitioned, each partition may be considered to act as a standalone computing system. Thus, two or more partitions may be combined to form a logical computing group inside the HPC system 100. Such grouping may be necessary if, for example, a particular computational task is allocated more processors or memory than a single operating system can control. For example, if a single operating system can control only 64 processors, but a particular computational task requires the combined power of 256 processors, then four partitions may be allocated to the task in such a group. This grouping may be accomplished using techniques known in the art, such as installing the same software on each computing partition and providing the partitions with a VPN.

Once at least one partition has been created, the partition may be booted and its computing resources initialized. Each computing partition, such as partition 160, may be viewed logically as having a single OS 191 and a single BIOS 192. As is known in the art, BIOS is a collection of instructions that electrically probes and initializes the available hardware to a known state so that the OS can boot, and is typically provided in a firmware chip on each physical server. However, a single logical computing partition 160 may span several blades, or even several blade chassis. A blade may be referred to as a "computing node" or simply a "node" to emphasize its allocation to a particular partition.

Booting a partition in accordance with an embodiment of the invention requires a number of modifications to be made to a blade chassis that is purchased from stock. In particular, the BIOS in each blade are modified to determine other hardware resources in the same computing partition, not just those in the same blade or blade chassis. After a boot command has been issued by the SMN 220, the hub ASIC 340 eventually provides an appropriate signal to the processor 320 to begin the boot process using BIOS instructions. The BIOS instructions, in turn, obtain partition information from the hub ASIC 340 such as: an identification (node) number in the partition, a node interconnection topology, a list of devices that are present in other nodes in the partition, a master clock signal used by all nodes in the partition, and so on. Armed with this information, the processor 320 may take whatever steps are required to initialize the blade 262, including 1) non-HPC-specific steps such as initializing I/O devices 332 and non-volatile storage 334, and 2) also HPC-specific steps such as synchronizing a local hardware clock to a master clock signal, initializing HPC-specialized hardware in a given node, managing a memory directory that includes information about which other nodes in the partition have accessed its RAM, and preparing a partition-wide physical memory map.

At this point, each physical BIOS has its own view of the partition, and all of the computing resources in each node are prepared for the OS to load. The BIOS then reads the OS image and executes it, in accordance with techniques known in the art of multiprocessor systems. The BIOS presents to the OS a view of the partition hardware as if it were all present in a single, very large computing device, even if the hardware itself is scattered among multiple blade chassis and blades. In this way, a single OS instance spreads itself across some, or preferably all, of the blade chassis and blades that are assigned to its partition. Different operating systems may be installed on the various partitions. If an OS image is not present, for example immediately after a partition is created, the OS image may be installed using processes known in the art before the partition boots.

Once the OS is safely executing, its partition may be operated as a single logical computing device. Software for carrying out desired computations may be installed to the various partitions by the HPC system operator. Users may then log into the SMN 220. Access to their respective partitions from the SMN 220 may be controlled using volume mounting and directory permissions based on login credentials, for example. The system operator may monitor the health of each partition, and take remedial steps when a hardware or software error is detected. The current state of long-running application programs may be saved to non-volatile storage, either periodically or on the command of the system operator or application user, to guard against losing work in the event of a system or application crash. The system operator or a system user may issue a command to shut down application software. Other operations of an HPC partition may be known to a person having ordinary skill in the art. When administratively required, the system operator may shut down a computing partition entirely, reallocate or deallocate computing resources in a partition, or power down the entire HPC system 100.

General Power Management

Figure 4:
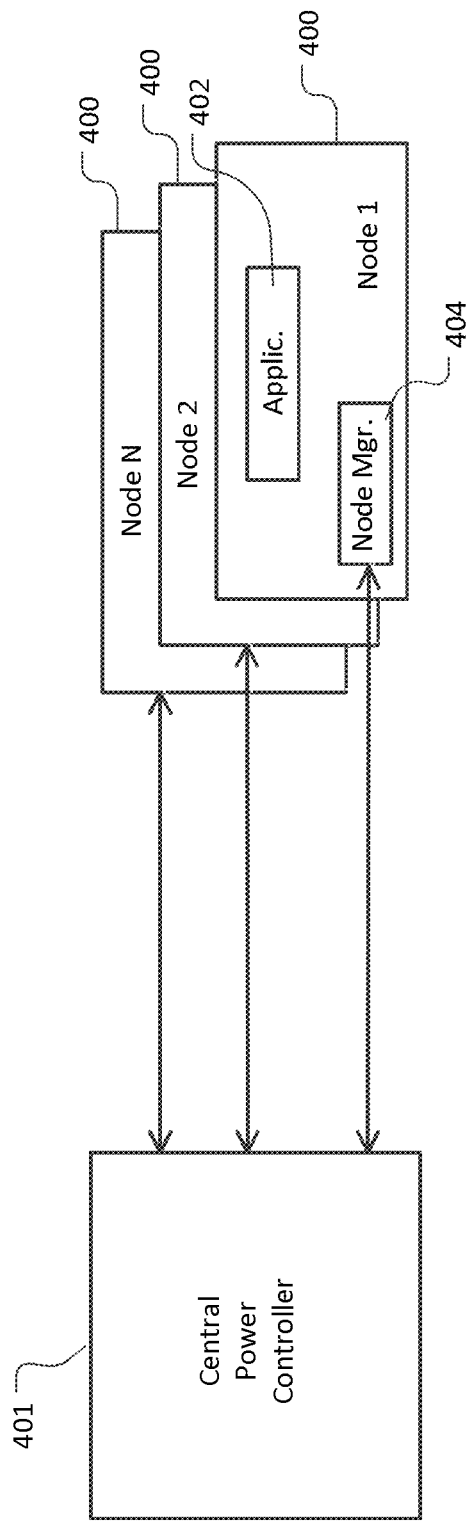
FIG. 4 schematically shows another representation of a plurality of nodes in the high-performance computing system of FIG. 1

As noted above, illustrative embodiments manage node power to ensure a more efficient and effective operation. To that end, FIG. 4 schematically shows another representation of a plurality of nodes (identified below as "nodes 400") in the high-performance computing system 100 of FIG. 1. Specifically, this figure shows a plurality of nodes 400, labeled as Node 1, Node 2 . . . Node N, that communicate with a central power controller 401 to coordinate their power needs. In other words, as discussed in greater detail below, after collecting the relevant system information, the central power controller 401 sets a power range in which the nodes 400 are required to operate. Alternative embodiments simply run the nodes 400 at a default power range.

In illustrative embodiments, the central power controller 401 is implemented separately from the nodes 400 and thus, has independent components, such as independent boards (e.g., motherboards, daughterboards, etc.), microprocessors, memory, etc. For example, the central power controller 401 may be implemented at least in part as a system management controller ("SMC," distributed by Intel Corporation of Santa Clara, Calif.), which controls power use in computer systems. The nodes 400 communicate with the central power controller 401 using any of the above noted interconnection mechanisms.

In addition to the components described in prior sections of this description for each node 400, this representation simply shows each node 400 executing an application program (referred to below as "application program 402"), and having a node manager 404 for managing its power functionality. Although showing only one application program 402, this figure should be considered to represent pluralities of application programs 402 that each execute across one or more of any of the nodes 400. For example, the first application program 402 may execute across Nodes 1, 3, and 44, while a second application may execute on Node 1 only, and a third application program 402 may execute across Nodes 3, 5, and 10-60. Accordingly, discussion of a single application executing on one or a few nodes is for simplicity purposes only.

Each node manager 404, which may be implemented as part of the hub ASIC 340 or as another component, preferably has a prescribed set of power management functions. To that end, each node manager 404 may be considered to be a dedicated management device on each node 400. As a functional module that communicates via the management network of the HPC 100, each node manager 404 measures and controls node power, provides power and usage statistics, and manages and enforces power policies. The node manager 404 thus can read an average power from power supplies, reduce/increase power draw to the processors by reducing/increasing processor frequencies, and regulate power and frequency to a target limit. For example, the node manager 404 can manage and enforce power policies set by the central power controller 401.

Indeed, it should be noted that, like FIGS. 1-3 and 5 (discussed below) FIG. 4 only schematically generically shows certain components. Those skilled in the art should understand that each of these components can be implemented in a variety of conventional manners, such as by using hardware, software, or a combination of hardware and software, across one or more other functional components. For example, the central power controller 401 may be implemented using a plurality of microprocessors executing firmware. As another example, the central power controller 401 may be implemented using one or more application specific integrated circuits (i.e., "ASICs") and related software, or a combination of ASICs, discrete electronic components (e.g., transistors), and microprocessors. Accordingly, the representation of the central power controller 401 and other components in a single box of FIG. 4 is for simplicity purposes only. In fact, in some embodiments, the central power controller 401 of FIG. 4 is distributed across a plurality of different machines—not necessarily within the same housing or chassis.

It should be reiterated that the schematic representation of components in these figures is a significantly simplified representation of an actual devices they represent. Those skilled in the art should understand that such devices may have many other physical and functional components. Accordingly, this discussion is in no way intended to suggest that these figures represents all of the elements of a component shown in the figures.

Figure 5:
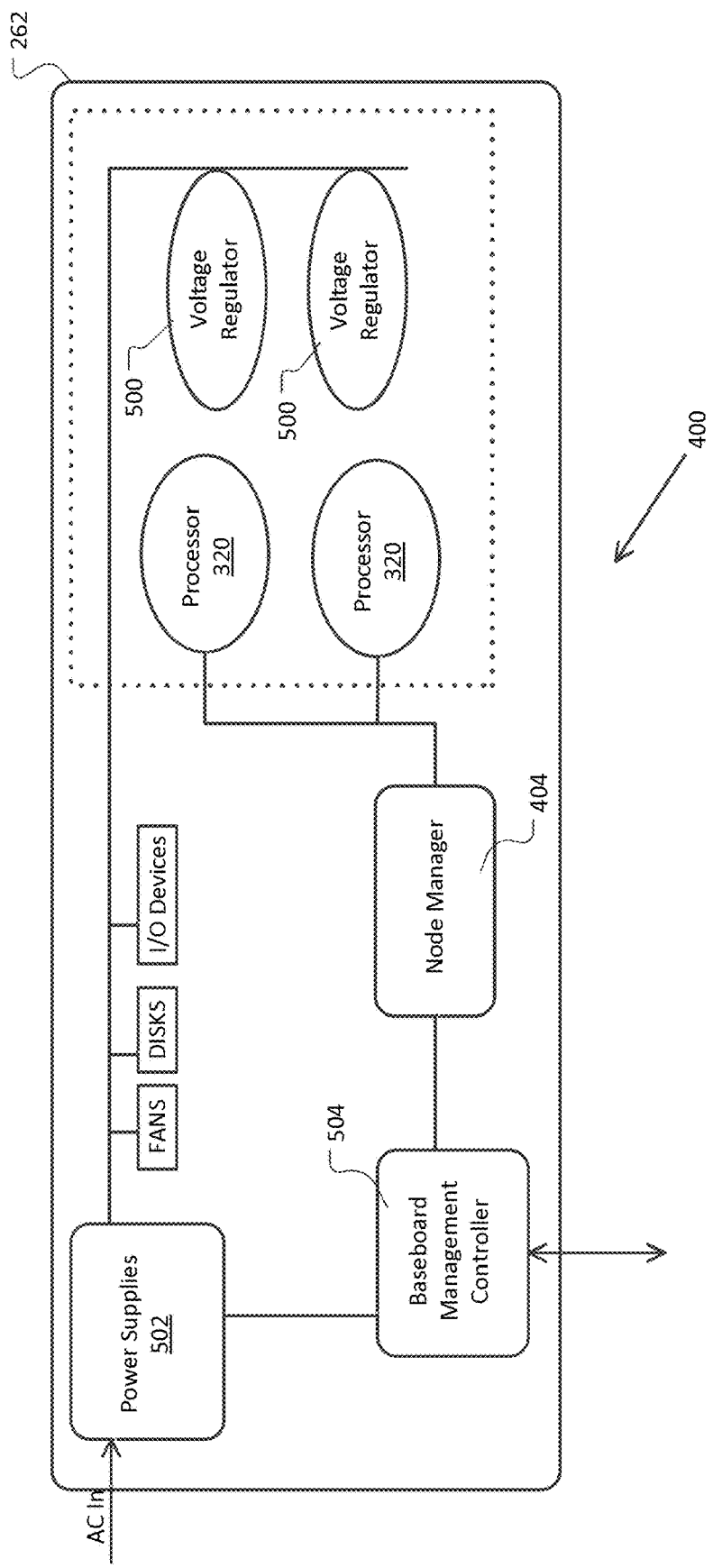
FIG. 5 schematically shows another view of one of the nodes of FIG. 4.

FIG. 5 schematically shows specific details of one of the nodes 400 of FIG. 4. In addition to showing the node manager 404, this figure also shows the processors 320 and voltage regulators 500 that control the power used by each of the processors 320. In addition, this figure also shows the power supply 502, which measures the power and converts input AC power to DC output power for use by the voltage regulators 500. The node 400 also has a baseboard management controller 504, which connects to system management to facilitate reading, obtaining, and setting power limits/ranges.

Figure 6:
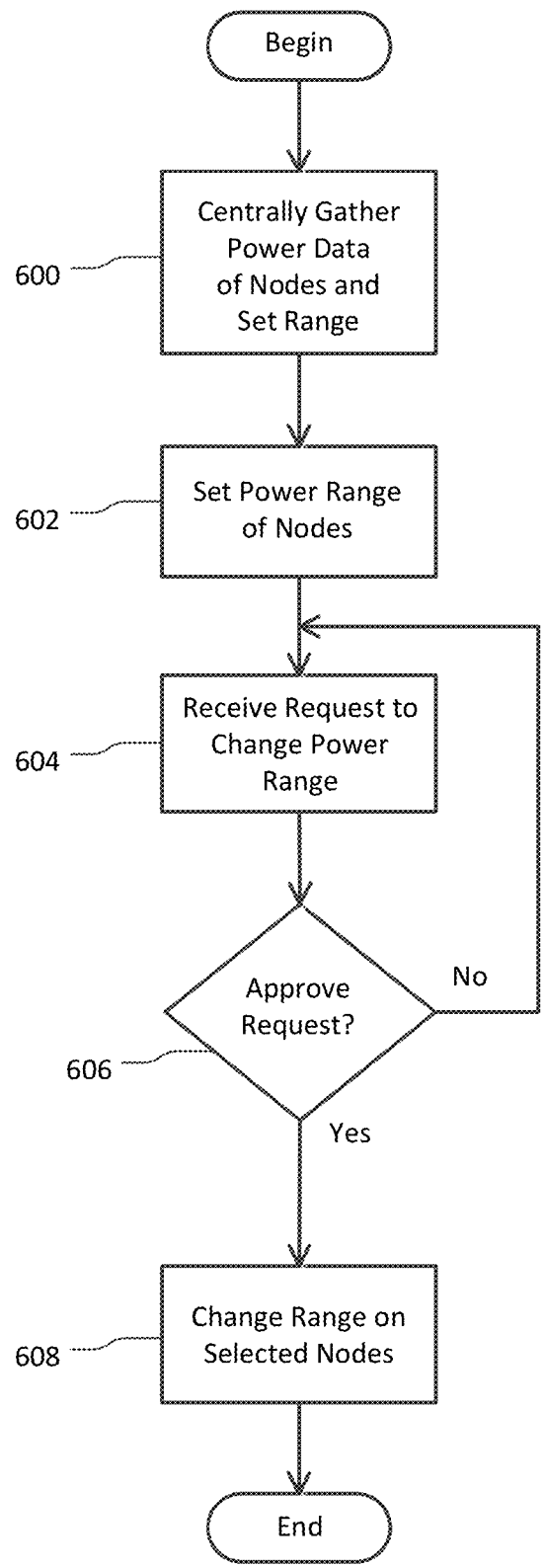
FIG. 6 shows a process of managing power consumption in a high-performance computing system in accordance with illustrative embodiments of the invention.

FIG. 6 shows a process of managing node power in the high-performance computing system 100 of FIG. 1. It should be noted that this process is substantially simplified from a longer process that normally would be used to manage power use by the nodes 400. Accordingly, the process can have many steps, such as specific techniques for formulate appropriate power levels, which those skilled in the art likely would use. In addition, some of the steps may be performed in a different order than that shown, or at the same time. Those skilled in the art therefore can modify the process as appropriate.

The process of FIG. 6 begins at step 600, in which the central power controller 401 gathers application information relating to the nodes 400 of the network that it manages. Among other things, the central power controller 401 may retrieve statistics, policies, and other relevant information from the node managers 404 on the plurality of nodes 400.

Some embodiments may have a plurality of different central power controllers 400 that are each assigned to specific pluralities of nodes 400 within the HPC system 100 (e.g., nodes within the same blade). Other embodiments, however, may have a single central power controller 401 that manages all of the nodes 400 within the HPC system 100. For simplicity purposes, this discussion only addresses a single central power controller 401 managing a plurality of nodes 400 of the HPC system 100. This plurality of nodes 400 also includes a set of nodes 400 executing an application program 402. This set of nodes 400 may include all of the plurality of nodes 400, or some smaller number of nodes 400. In fact, this set of nodes 400 can include a single node 400 executing a single application program 402. In alternative embodiments, the central controller 401 simply powers the nodes 400 at a default power.

After gathering the relevant information from the nodes, the central power controller 401 uses internal processes to set a prescribed power range for all of the nodes 400 it manages. In other words, using the gathered information, the central power controller 401 sets a centralized power range for the plurality of nodes 400. In illustrative embodiments, the power range has only a maximum power value. Accordingly, the nodes 400 managed by the central power controller 401 can run at powers up to the maximum power value. Other embodiments, however, may have ranges with both minimum and maximum power values.

Next, at 602, the central power controller 401 centrally sets/mandates the power range of the nodes 400 to the specified range determined at step 600. Illustrative embodiments may control power the number of ways, such as by limiting the clock speeds of the processors 322 resident in the nodes 400. Among other ways, this new power range may be set for an indefinite time period, or set to last for a prescribed time, such as until receipt of another mandated power range or until some event occurs.

To that end, the central power controller 401 forwards a power setting message to the node managers 404 the plurality of nodes 400 it manages; in this way, the central power controller 401 requires each of those nodes 400 to operate within the centrally mandated prescribed range. The node managers 404 responsively store this information in memory and limit power to this range as specified in the message.

Accordingly, this step sets the power limits of the plurality of nodes 400 to the specified range. Such a power range, however, may not be optimal for some set of the nodes 400, or all of the nodes 400. Specifically, several of the nodes 400 running a given application program 402 may require more power at certain times to efficiently and effectively execute. In that case, the centrally mandated power may be too low, slowing the processors 322 for those several nodes 400 to a reduced clock speed that is insufficient for the task the application program 402 must complete. If the given application program 402 cannot use extra power (e.g., speeding up its processors 322), then it may lag other threads/application programs 402 executing on the system, causing a number of local and systemic problems. For example, this delay can cause jitter the system, local and system errors, and generally slow processing.

To minimize the likelihood of those problems from occurring, illustrative embodiments permit a given application to operate at a power level that is different than that centrally mandated for the entire system. For example, the given application may operate at a power level for a prescribed time that is higher than that mandated for the nodes 400.

More specifically, the given application typically is a reliable source of information about its power needs and can determine its power requirements. It thus can best make the determination about the optimal power required to efficiently and effectively complete processing. Accordingly, before, during, or after receipt of the centrally mandated power range from the central power controller 401, the given application program 402 can request and receive approval for a different power range.

To that end, at step 604, after determining its power needs, the given application program 402 generates a power command or request, which it forwards to the central power controller 401 for approval. Indeed, those in the art understand that this command may be forwarded between the application program 402 and central power controller 401 via a number of intervening functional modules. As such, there is no requirement that the application program 402 directly forward the power command to the central power controller 401.

This power command has instructions specifically requesting that the central power controller 401 change the power range for the set of nodes 400 upon which it is executing. The central power controller 401 responsively determines at step 606 if it can in fact approve/grant the request. For example, while increased power may be beneficial for the set of nodes 400 running the given application program 402, it may have an intolerably adverse impact on those or other nodes 400/application programs 402 if granted. If that is the case, or there are other reasons for denying the request, then the process simply loops back to step 604 and does not approve the request. This denial may iterate indefinitely, or for a prescribed number of requests. The system administrator or other entity may set policies for approving requests and the number of requests it may receive.

Conversely, the central power controller 401 may approve the request and set an appropriate power under prescribed parameters. For example, the central power controller 401 may simply change the power range without any other changes to other requirements of the nodes 400. Other embodiments may simply remove power limitations or restrictions, permitting the at least one node 400 to use whatever power it requires.

In some embodiments, however, to compensate for the increased power demands, the central power controller 401 may grant the request, but require that the application run at a lower power at certain times. For example, the central power controller 401 may grant increased power for prescribed times, but require that the total power used by the set of nodes 400 not exceed a prescribed total value. In this case, the application program 402 may have certain execution paths that require a minimal amount of power. When executing those paths, the application program 402 may be configured to use a lower amount of power than it originally intended to use. In this manner, the system can maintain consistent overall power demands while meeting periodic power spikes.

Accordingly, if the central power controller 401 approves the request at step 606, then the process will change the power range on the set of nodes 400 running the application requesting the new power range. To that end, illustrative embodiments of the central power controller 401 forward a power change message to the node managers 404 of the affected set of nodes 400. After receipt of the message, each node manager 404 adjusts its internal settings to operate within the parameters set by the central power controller 401. As noted above, these parameters may include power values, times, and amounts of time to use the range. In fact, these parameters may include a plurality of different power ranges for different times. As also noted above, these different times can be set based upon events, specific times, or other bases as prescribed by those skilled in the art.

In some embodiments, if the application program 402 spans a plurality of nodes 400, then it may make only one request to the central power controller 401 for a power change in one, some, or all of the nodes 400 in which it is executing. Other embodiments, however, may make multiple such requests.

This process of FIG. 6 can repeat to dynamically change the power range even after the application program 402 has initially changed the power ranges of its set of nodes 400. Moreover, rather than having the application programs 402 determine and request power requirements, some embodiments may use other logic for controlling the power needs in the described manner. Such embodiments may be considered to cooperate with the application program 402 and effectively act as the application program 402.

Illustrative embodiments therefore enable a given application program 402 to dynamically change its power requirements to optimize system performance. Accordingly, the given application may have the capability to operate at speeds that ensure coherency, efficiency, and overall effectiveness.

Thermal Management

High-performance computing systems, such as the one described above, consume significant amounts of power and thus, generate correspondingly significant amounts of heat. Accordingly, those skilled in the art have developed a number of different techniques for cooling the heat generating components of the system (e.g., the processors 320, memory 326, etc.). One technique uses a closed loop channel containing liquid coolant (e.g., water) that absorbs heat from the heat generating elements, and cycles through a cooler portion of the environment, such as the outside of the building containing the computer system.

Cooler environments simply may channel coils carrying the liquid coolant past fans/blowers that blow cooler air on the coils, thus creating a convective cooling effect. Undesirably, such convective cooling systems (referred to as "dry cooling systems") may not provide sufficient cooling in warmer climates, or even on some days in cooler climates. To manage this problem, some systems use "wet cooling systems," which, in addition to blowing air onto the coils, typically spray water onto the coils for enhanced cooling. These systems thus often are referred to as "evaporative cooling systems." To get the benefits of both systems, some high-performance computing systems take a hybrid approach by using a "hybrid cooler," which operates either in a dry cooling mode (i.e., like a dry cooling system) or in a wet cooling mode (i.e., like a wet cooling system) when needed. For example, the majority of the time, the hybrid cooler may operate in a dry cooling mode, but switch to a wet cooling mode on certain unusually hotter days.

Many parts of the world, however, are in drought conditions or have significant water shortages. Many have predicted that water shortages will be a primary problem of the 21st-century. Accordingly, illustrative embodiments control the power consumption of the high-performance computing system to minimize the need to use more effective cooling processes (e.g., wet cooling processes). To that end, logic within the high-performance computing system preferably determines the thermal profile of the system and temporarily throttles back processor speed at prescribed times so that they do not require wet cooling processes. Although it is expected to slow overall system speed, it can reduce water demand from the cooling system.

For example, a hybrid cooling system may begin its wet cooling mode when the temperature detected in the environment or in a certain portion of the high-performance computing system meets or exceeds X degrees C. Accordingly, the central power controller 401 may manage the speed of the processors 320 within a node 400, a blade, or the entire system in an effort to ensure that the noted temperature does not exceed X degrees C. Specifically, reducing the speed of the processors 320 typically reduces the heat they generate. Stated another way, supplying less power to the processors 320 causes them to generate less heat.

Among other ways to accomplish these goals, the central power controller 401 (or other system logic) may incrementally reduce the processor speed (e.g., by increments of one percent or by uneven increments), and periodically check the temperature of some system related area using a closed loop process. Other embodiments may simply program the power controller 400 to reduce the processor speeds to a prescribed lower speed for a prescribed time. To operate effectively, these latter embodiments likely require some predictive knowledge of the behavior of the system, and anticipated temperatures. As noted above, the processor speeds can be controlled at the node level (e.g., within one or more of the processors 320 in a given node 400), the blade level, the rack level, system-level, or an entire data center level.

Indeed, those skilled in the art may apply other techniques for managing the system power. For example, during a hot day, some or all of the system may be subject to a strict power limit/cap, resulting in processor speed management in the manner described. For example, a high priority application 402 executing on a node 400 may require a "burst" of speed and thus, may be permitted to exceed certain limits as described above in the previous sections. When that happens, the central power controller 401 should ensure that the total power budget does not approach or exceed critical limits.

In other words, when a high priority application 402 is running at a higher speed, the total system power should still be below the power limit. If not, then the exception for the high priority application 402 should not be allowed—it too will execute at a slower rate. The power controller 400 thus may set the power limit with a certain amount of headroom from the mean power usage to permit higher speeds for high priority applications 402. Alternatively or in addition, the power controller 400 may compensate for the increased power required by the high priority application 402 by reducing the speed of processors 320 at certain other parts of the system even further below the power limit.

Illustrative embodiments thus may eliminate the need for a hybrid cooling system. In fact, illustrative embodiments also may eliminate the need for an expensive chiller, which passes the cooling coils through a refrigerant to even more effectively cool the system in hot environments. Some data centers, for example, have both a wet cooling system and a somewhat redundant chiller to ensure that heating problems do not adversely impact system performance.

Many such systems, however, only need the power of a chiller for a few days a year. The rest of the time, a wet cooling system or even a dry cooling system may suffice. Despite that, absent use of various embodiments of the invention, operators of such systems unnecessarily incur the increased capital costs by acquiring the chiller.

In fact, many other high-performance computing systems often have a chiller as its sole source of cooling. While possibly reducing capital costs by only having one cooling source, those systems have higher incremental energy/operational costs than dry or wet cooling systems. Selectively reducing the processor speed therefore permits use of less expensive cooling sources, and eliminates the need for some redundant, standby cooling systems.

Figure 7:
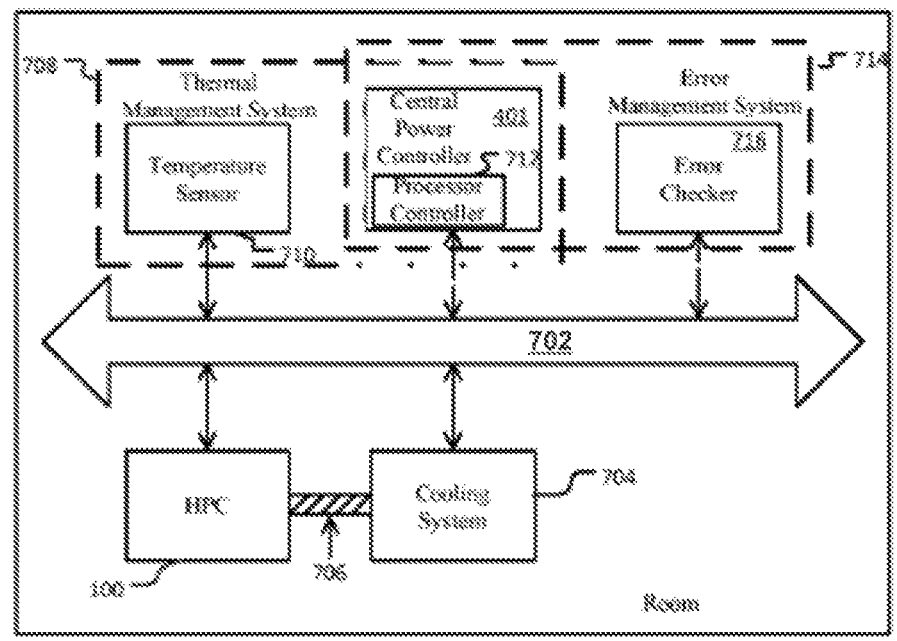
FIG. 7 schematically shows a view of a room having a high performance computing system and an apparatus for managing power consumption of the high performance computing system in accordance with various embodiments of the invention.

Those skilled in the art can implement this systemic thermal management using a number of processes and devices. To that end, FIG. 7 schematically shows a room 700 containing a high-performance computing systems and its attendant thermal management devices. It should be noted that this drawing may be considered to be another way of looking at the overall system shown in FIGS. 1-4.

Each of the components of FIG. 7 is operatively connected by any conventional interconnect mechanism. FIG. 7 simply shows a bus 702 communicating each the components. Those skilled in the art should understand that this generalized representation can be modified to include other conventional direct or indirect connections. Accordingly, discussion of a bus 702 is not intended to limit various embodiments.

Indeed, it should be noted that FIG. 7 only schematically shows each of the below discussed components. Those skilled in the art should understand that each of these components can be implemented in a variety of conventional manners, such as by using hardware, software, or a combination of hardware and software, across one or more other functional components. For example, the central power controller 401 may be implemented using a plurality of microprocessors executing firmware. As another example, the central power controller 401 may be implemented using one or more application specific integrated circuits (i.e., "ASICs") and related software, or a combination of ASICs, discrete electronic components (e.g., transistors), and microprocessors. Accordingly, the representation of the central power controller 401 and other components in a single box of FIG. 7 is for simplicity purposes only. In fact, in some embodiments, the central power controller 401 is distributed across a plurality of different devices—not necessarily within the same housing or chassis.

It should be reiterated that the representation of FIG. 7 is a significantly simplified representation of high-performance computing system components. Those skilled in the art should understand that the system and the shown subsystems have many other physical and functional components not in this figure (but many shown in other figures), such as central processing units 320 and RAM 316. Accordingly, this discussion is in no way intended to suggest that FIG. 7 represents all of the elements of an apparatus used in a high performance computing system.

Specifically, the system of FIG. 7 includes the noted high-performance computing system 100 physically and logically connected with the above noted cooling system (identified in FIG. 7 using reference number "704"). Accordingly, as noted above, the cooling system 704 has one or more coils 706, filled with a refrigerant, such as water, that draw energy from the heat producing elements of the high-performance computing system. The cooling system 704 may externally cool these coils 706 by any of a number of means, such as those discussed above. Accordingly, the cooling system 704 may have the above noted dry cooling mode, one or more additional wet cooling modes (e.g., one mode that sprays the coils 706 with water), and/or another mode using a chiller.

In illustrative embodiments, a thermal management system 708 controls and coordinates the cooling system 704 and high-performance computing system to optimize cooling as a function of power drawn by the high-performance computing system. For example, as noted above, the thermal management system 708 may reduce processor speed of the high-performance computing system as a function of some environmental temperature, and/or change the mode of the cooling system 704.

To those ends, the thermal management system 708 has a temperature sensor 710 that determines the temperature of some environmental condition (discussed below), and a processor controller 712 that interacts with the node managers 404 to control processor speed as a function of the determined temperature. In this example, the processor controller 712 is implemented as part of the central power controller 401 (FIG. 4). Other embodiments, however, may implement the processor controller 712 independently of the central power controller 401.

FIG. 7 also shows an error management system 714 that includes the central power controller 401, its processor controller 712, and an error checker 716 that detects certain prescribed error conditions. In a manner similar to the thermal management system 708 and discussed in greater detail below in the "System Robustness" section, the error management system 714 controls processor speed as a function of detected correctable errors.

The room 700 may be any conventional building or edifice conventionally housing high-performance computing systems. For example, the room 700 may be a climate controlled data center that manages high-performance computing systems of various commercial, scientific, and/or industrial entities. Although not shown, the coils 706 may extend outside of the room 700 to another room, or outside of the building containing the room 700.

Figure 8:
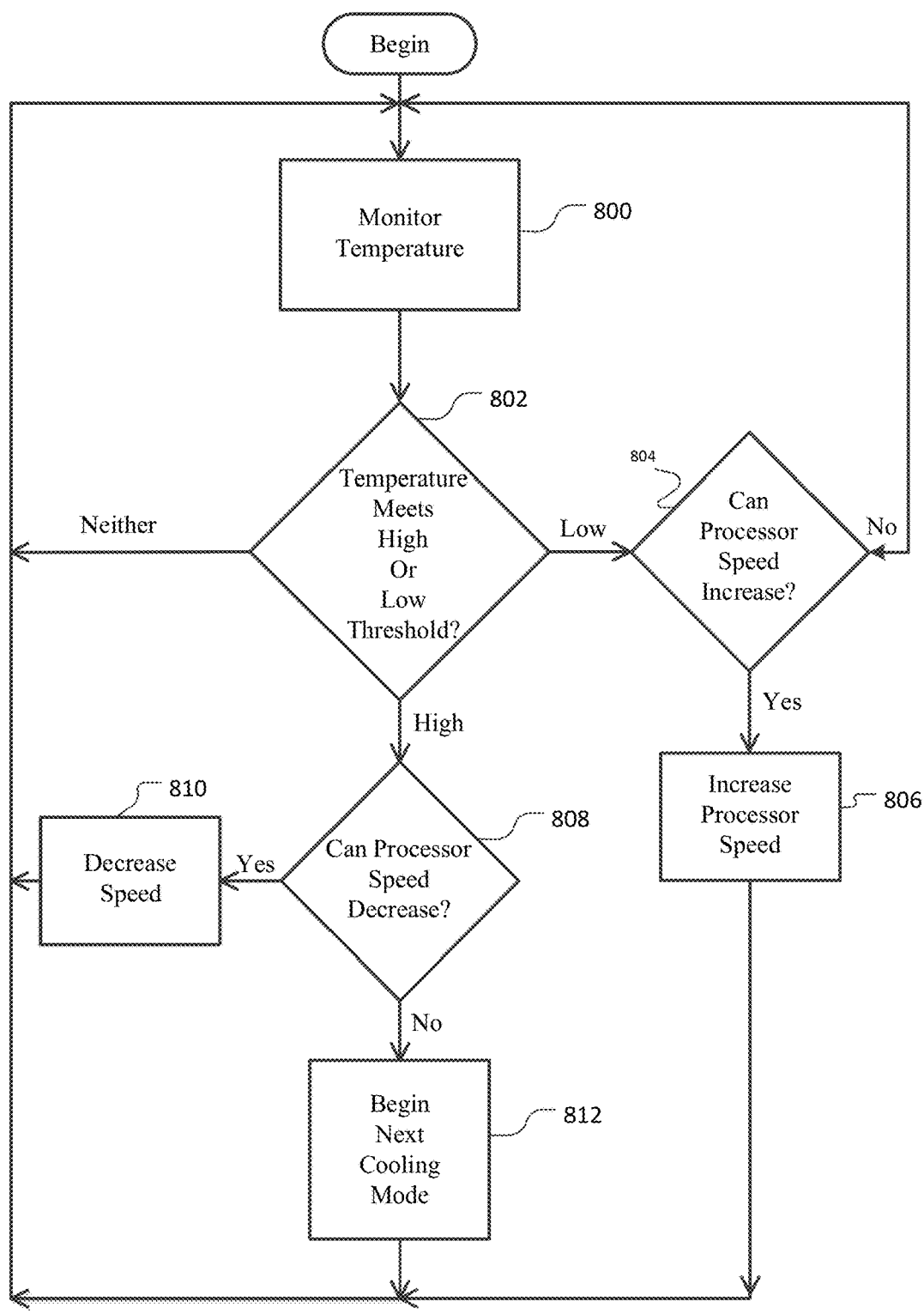
FIG. 8 shows a process of managing the thermal profile of a high-performance computing system in accordance with illustrative embodiments of the invention.

FIG. 8 shows a process of managing the thermal profile of the high-performance computing system in accordance with illustrative embodiments of the invention. In a manner similar to FIG. 6, it should be noted that this process is substantially simplified from a longer process that normally would be used to manage power use by the nodes 400. Accordingly, the process can have many steps, such as specific techniques for formulate appropriate power levels, which those skilled in the art likely would use. In addition, some of the steps may be performed in a different order than that shown, or at the same time. Those skilled in the art therefore can modify the process as appropriate.

The process begins at step 800, in which the temperature sensor 710 monitors the temperature of some environment or device related to the high-performance computing system. To that end, the temperature sensor 710 may collaborate with the node managers 404, retrieve the temperature data independently of the node managers 404, or rely exclusively on data from the node managers 404. In some embodiments, step 800 monitors the temperature of the room 700 housing the high-performance computing system. For example, the temperature sensor 710, which may include a plurality of separate temperature sensors 710 at different locations, may be positioned near the high-performance computing system. In that case, the temperature sensor 710 detects the air temperature of certain parts of the room 700. Those skilled in the art can position the sensor(s) in appropriate locations based upon a number of factors, such as the proximity to the heat generating components of the high-performance computing system. Alternatively or additionally, the sensors may detect environmental conditions outside of the room 700, such as in the environment outside of the building containing the room 700.

Other embodiments may position the sensor(s) near or at specific components of the high-performance computing system. Among other things, the sensors may be positioned to sense the operating temperatures of some or all of the processors 320, the memory (e.g., RAM cards 326 and RAM chips 326), the hub ASIC 340, and the power supplies 502.

The central power controller 401 receives some or all of these temperature readings and then determines if it should change the power consumption of the processors 320; i.e., if it should change the processing speed of the processors 320. The process thus continues to step 802, in which the central power controller 401 determines if the detected temperatures alone or together meet high or low prescribed temperature requirements.

Specifically, the central power controller 401 uses an algorithm to determine if it should change the processing speed. Among other ways, these algorithms may be developed using artificial intelligence, experimentation, empirical methods, and other similar techniques. In the simple case, the central power controller 401 may receive a single temperature value (e.g., the temperature in a region of the room 700, or the temperature of one of the power supplies 502) and compare it to prescribed upper and/or lower threshold values. If that single temperature value is greater than the prescribed upper threshold value, then the power controller 400 may reduce power consumption. Other embodiments, however, may use temperature readings from a number of different sensors (e.g., both the environmental temperature and a component temperature) to determine if the central power controller 401 should take action to increase or decrease power/processing speed.

For example, the central power controller 401 may receive temperature values from 15 different components and/or different regions of the room 700, such as the processors 320, power supplies 502, and memory 326. An internal algorithm may apply scaling factors and weightings to the different temperatures to determine if the aggregate temperature changes warrant a change in power consumption. A similar example may receive temperature values from the same 15 different components and/or different regions of the room 700, and change power consumption if some prescribed number of those temperature values exceeds the range defined by the noted prescribed upper and lower threshold values. Both examples also may have a temporal component that requires the temperature to be outside of the noted range for a prescribed amount of time before taking action. Accordingly, this temporal approach can avoid system delay, jitter and other adverse effects of short-term positive or negative temperature spikes.

Accordingly, continuing with step 802, the central power controller 401 determines if the temperature (i.e., the actual temperature value or a value produced as a function of the temperature values received from the temperature sensor(s) 710) is within the above discussed prescribed temperature range. It should be noted that some embodiments do not have a lower temperature range. If the embodiment has a lower temperature threshold, and the temperature is below that low temperature threshold, then the process continues to step 804, which determines if the processor speed can be increased. There are a number of reasons for not increasing the processor speed. Among other reasons, the processor 320 may be running at its maximum speed as set by the central power controller 401, or it simply may not be able to run faster.

If the processor 320 cannot increase at speed, then the process loops back to monitor the relevant temperature(s) (step 800). If, however, the processor 320 can increase its speed, then the processor controller 712 increases the processor speed by some amount (step 806). Among other ways, the processor controller 712 may increase the speed of the processor 320 by a prescribed percentage, an absolute amount, to an increased speed, or as a function of other processes and requirements of the high-performance computing system 100.

Among other ways, the processor controller 712 may increase the speed indefinitely, for up to a prescribed amount of time, or based on some other criteria. After the prescribed amount of time, the processor controller 712 may change the speed to another value, such as back to one or more earlier speeds at which the processor 320 executed, or at another speed as specified by the processor controller 712. The selected amount of time nevertheless may be interrupted and thus, change if some other event necessitates a different change in processing speed (e.g., by a subsequent temperature change when iteratively executing the process of FIG. 8).

Returning to step 802, if the temperature is within the range, then the process simply loops back to step 800 to monitor the relevant temperature(s). Finally, if step 802 determines that the temperature exceeds the high temperature threshold, then the process continues to step 808, which determines if the processor speed can decrease. There are reasons for not decreasing speed despite the increased temperature. For example, as discussed above, a decrease of processor speed may adversely affect execution of an application 402 or other system functions. If the central power controller 401 determines that the processor speed can decrease, then its processor controller 712 forwards a speed reduction message to the appropriate nodes 400, decreasing processor speed (step 810). Among other ways, the processor controller 712 may decrease the speed of the processor 320 by a prescribed percentage, an absolute amount, to a reduced speed, or as a function of other processes and requirements of the high-performance computing system. It should be noted that the central power controller 400 can decrease the power in any convenient portion of the high performance computing system 100.

In a manner similar to that discussed above with regard to step 806, the processor controller 712 may decrease the speed indefinitely, up to a prescribed amount of time, or based on some other criteria. After the prescribed amount of time, the processor controller 712 may change the speed to another value, such as back to one or more earlier speeds at which the processor 320 executed, or at another speed as specified by the processor controller 712. The selected amount of time nevertheless may be interrupted and thus, change if some other event necessitates different change in processing speed (e.g., by a subsequent temperature change when iteratively executing the process of FIG. 8).

The processor controller 712 also may decrease processing speed until the monitored temperature (or multi-temperature function of various different areas and/or over a prescribed time frame) decreases to a prescribed temperature. For example, the processor controller 712 may use a prescribed temperature value, and a certain tolerance, after which the processor speed may be increased while using the dry cooling mode, or a less water or energy intensive wet cooling mode.

The amount of time selected to decrease (or increase) the clock speeds can be determined based on a number of different techniques. Among others, those skilled in the art may use artificial intelligence, current and historical system data, and empirical experimental data.

After decreasing the processing speed at step 810, the process loops back to step 800 to continue monitoring the relevant temperature(s). If, however, step 808 determines that the processor speeds cannot be decreased, then the process continues to step 812, which begins the next cooling mode. For example, the process may change the mode of the cooling system 704 from a lower mode, such as a dry cooling mode, to a water intensive cooling mode, such as a wet cooling mode. Some embodiments may skip this step and simply send a warning or notice message to the system operators.

There also may be instances when the monitored temperature continues to rise despite reduced processing speeds. In that case, after reducing the processing speed to a lower speed in response to the monitored temperature, the central power controller 401 may maintain the processing speed at the reduced amount and switch the cooling system 704 to a higher mode, such as from a dry cooling mode to a wet cooling mode—or even to a chiller. The processing speed may continue to be no greater than the reduced value for at least a portion of the time the cooling system 704 is in the wet cooling mode. As the coils 706 cool, however, the processing speed may be increased, or the cooling mode may switch back to a dry cooling mode.

Some embodiments may preemptively reduce processing speed as a function of the known cooling capacity of one of the cooling modes. For example, the central power controller 401 may determine that the cooling capacity of a lower cooling mode, such as a dry cooling mode, requires a prescribed maximum processing speed at certain times. If the processing speed is higher, then this lower cooling mode may not be able to adequately cool the system 100. This determination may be made as a function of a number of variables, including time of day, historical performance of the high-performance computing system, executing applications 502, etc. The central power controller 401 therefore may preemptively reduce the processing speeds to maintain the cooling system 704 and one or more lower, more efficient cooling modes.

The central power controller 401 also may monitor the health of the cooling system 704, and take appropriate action if it detects a malfunction with the cooling system 704. For example, after detecting a malfunction in the cooling system 704, such as full cooling system failure, the central power controller 401 may reduce processing speeds to a level that can tolerate the lost cooling functionality, and/or turn off the cooling system 704. Of course, a cooling system malfunction does not necessarily eviscerate complete cooling functionality. Some malfunctions may eviscerate certain cooling modes, or decrease the efficiency of certain modes. For example, if the central power controller 401 detects that the wet cooling modes are not functioning, then its processor controller 712 may preemptively reduce processing speeds to accommodate the more efficient but less effective dry cooling modes. As another example, if the central power controller 401 detects that the dry cooling mode is not functioning but the wet mode is functioning appropriately, then its processor controller 712 may increase processing speeds to take advantage of the increased cooling capacity of the wet cooling mode.

In a similar manner, some embodiments of the central power controller 401 may have tools to detect a potential upcoming failure in the cooling system 704. For example, the cooling system 704 may behave in a certain way indicative of impending failure or malfunction. In that case, the central power controller 401 may preemptively reduce the processing speed to avoid a potential catastrophic systemic breakdown.

It should be noted that although processing speed changes were discussed on the node level, those skilled in the art may selectively change processing speeds among a subset of processors 320 on a single node 400, or a subset of specific processors 320 across nodes 400. Also like other embodiments discussed above, processing speed changes may be made across other levels, such as across the blade level, the rack level, system-level, or an entire data center level.

Accordingly, illustrative embodiments permit a user to use less expensive cooling alternatives. When the need arises, however (e.g., outside weather conditions exceed certain limits), then a system may switch to the next "level-up" in cooling capability. For example, when required, the system can change from 1) normally dry-cooling to the next level-up, which may be wet cooling, or 2) normal wet cooling to a chiller (i.e., the next level-up). Among other benefits, a user thus can acquire the next level-up cooling system 704 as backup for when weather conditions exceed limits (i.e., they can switch to the next level-up system in limited instances to save water and/or energy). Alternatively, a user can use only a single level cooling system 704 (i.e., not acquire the next level-up system as backup), thus saving capital costs.

System Robustness

In a manner similar to other computer systems, high-performance computing systems are subject to failure, such as when an uncorrectable error occurs during runtime. Many errors that occur during runtime are correctable, however, and thus do not cause immediate system failure. For example, among others, those correctable errors may include certain types of memory errors, processor errors, or network errors.

The inventors recognized that system failure often is preceded by certain conditions, such as when the system experiences a relatively high number of correctable errors. The inventors also recognized that high-performance computing systems may be more prone to such errors when running its processors 320 at a high rate.

To meet this problem, the inventors discovered that they could reduce the speed of some or all of the processors 320 running on the high-performance computing system when logic on the system detects certain conditions. As noted above, those conditions may include detecting a prescribed number of correctable errors over a certain time, or a prescribed type of correctable error. Of course, those skilled in the art can reduce the processor speed upon detection other conditions. Discussion of certain numbers and types of correctable errors therefore is an example of one way of detecting a potential system problem and thus, is not intended to limit certain embodiments.

Accordingly, when illustrative embodiments detect the prescribed condition, logic may slow the processing speed of one or more processors 320 in the system 100. Like other embodiments, the processing speeds can be controlled at the node level (e.g., within one or more of the processors 320 in a given node 400), the blade level, the rack level, system-level, or an entire data center level. Those skilled in the art can select any of a number of ways to slow the processing speeds. For example, logic may slow the system down incrementally to a point where the number of current correctable errors is beneath a prescribed threshold. As a second example, however, logic may slow the system down to a prescribed speed (e.g., 10 percent or 15 percent of normal speed) until conditions meet certain normal requirements.

Some embodiments may reduce the speed until certain threads or processes have completed their execution. For example, a process may have been executing for two weeks and needs another day to complete processing (or another day to reach an appropriate stopping point). If the system slows down by ten percent, then that process may need another 1.1 days to complete processing. At this slower speed, the system should be less stressed and thus, more stable, reducing the likelihood that the system will fail before completion of this process. If the system were not to slow down, however, it would be more likely to fail, undesirably losing two weeks of processing. Increasing the processing time by such a small amount (relative to the total processing time) therefore can yield substantial benefits.

After the process in the above example has completed executing, or the system has met some other prescribed criteria, some or all of the system may be shut down so that a technician may repair the source of the errors. Alternatively, rather than shutting down the system, to repair the source of the errors, some embodiments may hot-swap specific portions of the system.

Figure 9:
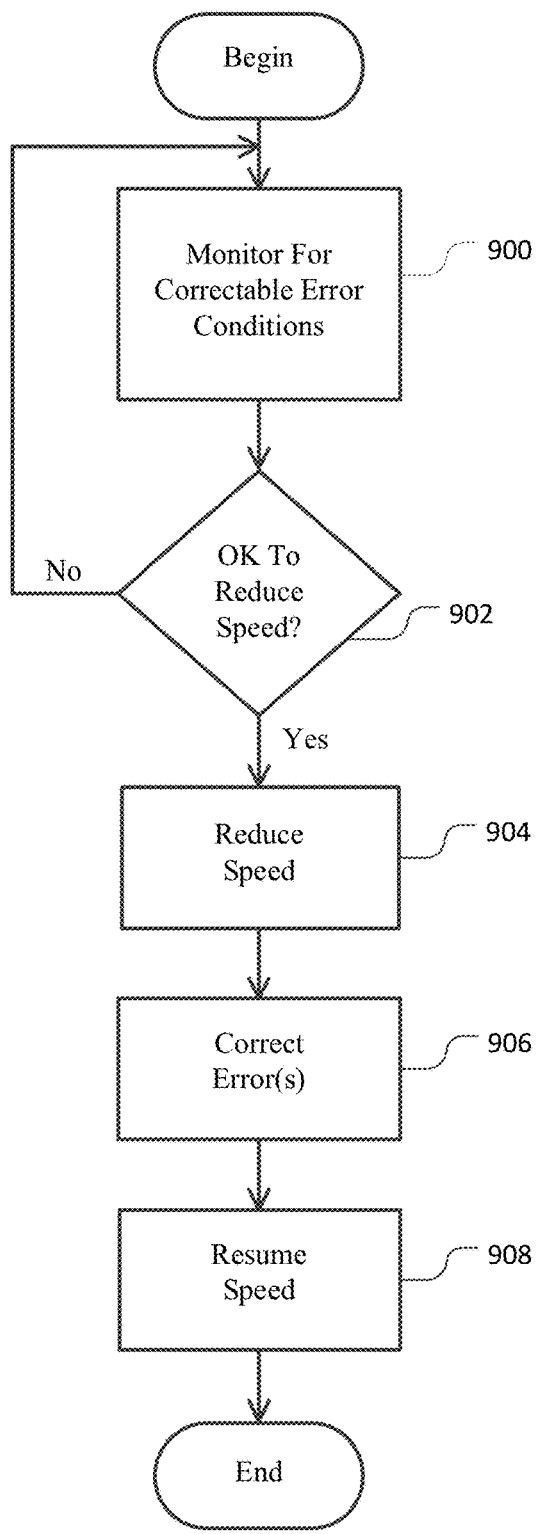
FIG. 9 shows a process of managing errors of a high-performance computing system in accordance with illustrative embodiments of the invention.

To those ends, FIG. 9 shows a process of managing errors of the high-performance computing system 100 in accordance with illustrative embodiments of the invention. This process preferably is performed by the error management system 714. In a manner similar to FIGS. 6 and 8, this process is substantially simplified from a longer process that normally would be used to manage errors of the high performance computing system 100. Accordingly, the process can have many steps, such as specific techniques for formulating appropriate power levels, which those skilled in the art likely would use. In addition, some of the steps may be performed in a different order than that shown, or at the same time. Those skilled in the art therefore can modify the process as appropriate.

The method begins at step 900, in which the error checker 716 monitors some or all of the high performance computing system 100 for any of a plurality of correctable error conditions. As noted above, these errors may include any of a wide variety of prescribed or un-prescribed correctable error conditions. For example, those error conditions may include memory correctable errors and network correctable errors detected by incorrect checksums or hash functions. Rather than directly detecting error conditions, however, some embodiments may indirectly detect evidence of error conditions. For example, elevated temperatures of certain system components, such as that of a processor 320, a power supply 502, or a memory chip 326, can indicate a high likelihood of an error condition.

Regardless of the mode of detecting errors, the central power controller 401 has a prescribed set of rules and/or algorithms for determining whether a correctable error warrants processor speed reductions. Among other ways, these algorithms may be developed using artificial intelligence, experimentation, empirical methods, current system performance, and other similar techniques. For example, the central power controller 401 may score various error conditions on a weighted scale, add up the weighted values, and determine if the sum of those weights exceeds a prescribed threshold value. As a second example, the central power controller 401 may have specific error conditions that, regardless of weightings or algorithms, require a reduction in processor speed. As yet another example, the central power controller 401 may reduce speeds simply based on the aggregate total number of correctable errors in the entire system 100, or on a specific portion of the system 100.

Accordingly, after detecting a correctable error condition, the central power controller 401 determines at step 902 if the processor speed may be reduced. For example, a critical application 402 may be executing on the node(s) 400 in question and cannot be disturbed. In that case, the process may loop back to step 900 to continue monitoring for error correctable conditions. The central power controller 401, however, may take additional action at that point to ensure the operation of the system. For example, the central power controller 401 may selectively reduce power to other processors 320, and/or send a warning message to a system user indicating the potential problem.

If the central power controller 401 determines that it may reduce processor speed, then the process continues to step 904, which reduces the processor speeds in any of a variety of manners. Among other ways, the processor controller 712 may decrease the speed of the processor 320 by a prescribed percentage, an absolute amount, to a reduced speed, or as a function of other processes and requirements of the high performance computing system 100.

In a manner similar to that discussed above with regard to FIG. 8, the processor controller 712 may decrease the speed indefinitely, up to or for a prescribed time, or based on some other criteria. After the prescribed time, the processor controller 712 may change the speed to another value, such as back to one or more earlier speeds at which the processor 320 executed, or at another speed as specified by the processor controller 712. The selected amount of time nevertheless may be interrupted and thus, change if some other event necessitates different change in processing speed (e.g., by a subsequent change when iteratively executing the process of FIG. 8).

The processor controller 712 also may decrease the speed until the monitored temperature decreases to a prescribed temperature. The amount of time selected to decrease the processing speeds can be determined based on a number of different techniques. Among others, those skilled in the art may use artificial intelligence, current and historical system data, and empirical experimental data.

Importantly, the processing speeds are slowed both for a time period and at a speed that should optimally ensure system effectiveness—reducing the likelihood of system failure.

After reducing the speed, the process continues to step 906, in which logic or an operator corrects the located errors. Among other ways, the system can run with the (selected) processors 320 executing at a reduced speed until a technician can shut down the system and fix or replace potentially damaged or damaged components. Alternatively, the system can run with the noted processors 320 at their reduced rate until a technician can fix the errors by a hot swap or similar technique. For example, the technician may hot-swap certain boards having defective components with new boards having uncorrupted, similar components.

The process concludes at step 908 by resuming processing speeds to the normal state.

Accordingly, reducing microprocessor speed in this manner provides the system with a better chance of executing to a later point in time where remedial actions can be taken without substantial usage disruption.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

For example, illustrative embodiments may include a computer program product for use on a computer system for thermally managing a high performance computing system, the computer program product comprising a tangible, non-transient computer usable medium having computer readable program code thereon, the computer readable program code comprising:

program code for monitoring the temperature of at least one of a) the environment of the high performance computing system and b) at least a portion of the high performance computing system, the high performance computing system having a plurality of nodes with microprocessors; and program code for controlling the processing speed of at least one of the microprocessors on at least one of the plurality of nodes as a function of at least one of the monitored temperatures.

Another example may involve a computer program product for use on a computer system for managing a high performance computing system, the computer program product comprising a tangible, non-transient computer usable medium having computer readable program code thereon, the computer readable program code comprising:

program code for detecting a prescribed error condition of the high performance computing system, the high performance computing system having a plurality of nodes with microprocessors; and program code for reducing the processing speed of at least one of the microprocessors on at least one of the plurality of nodes after detecting the prescribed error condition.

Although the above discussion discloses various exemplary embodiments of the invention, it should be apparent that those skilled in the art can make various modifications that will achieve some of the advantages of the invention without departing from the true scope of the invention.

What is claimed is:

1. A method of managing errors of a high performance computing system, the method comprising:

detecting an error condition of the high performance computing system, the high performance computing system having a plurality of nodes with microprocessors and a cooling system operable in a first cooling mode and a second cooling mode different than the first cooling mode;

thermally conducting heat away from at least one of the plurality of nodes under the first cooling mode in response to the detected error condition exceeding a first threshold;

thermally conducting heat away from at least one of the plurality of nodes under the second cooling mode in response to the detected error condition exceeding a second threshold; and reducing a processing speed of at least one of the microprocessors on at least one of the plurality of nodes in response to the detected error condition exceeding the first threshold and such that the detected error condition is maintained at or below the second threshold so as to prolong cooling under the first cooling mode, wherein the detected error condition comprises a temperature reading of at least one of the nodes, wherein the first threshold comprises a first temperature threshold, wherein the second threshold comprises a second temperature threshold greater than the first temperature threshold and wherein the processing speed of at least one of the microprocessors on at least one of the plurality of nodes is reduced in response to the temperature reading exceeding the first temperature threshold to maintain the temperature reading at or below the second temperature threshold so as to prolong cooling under the first cooling mode.

2. The method as defined by claim 1 wherein the error condition includes at least one of a correctable error and a temperature reading of at least one of the nodes.

3. The method as defined by claim 2 wherein the correctable error includes at least one of a memory correctable error and a network correctable error.

4. The method as defined by claim 1 wherein the at least one microprocessor's processing speed normally is at a current level, further wherein reducing comprises: permitting the processing speed to maintain current levels; and reducing the processing speed from current levels after detecting a plurality of error conditions.

5. The method as defined by claim 1 wherein detecting comprises detecting a plurality of error conditions of the high performance computing system, and wherein the reducing comprises reducing the processing speed as a function of the plurality of error conditions.

6. The method as defined by claim 1 further comprising, after detecting the error condition, hot swapping at least a portion of the high performance computing system, or stopping execution of at least a portion of the high performance computing system.

7. The method as defined by claim 1 further comprising executing a task on a given node of the plurality of nodes, wherein the detecting comprises detecting an error condition on the given node, and wherein the reducing comprises postponing reduction of the processing speed of at least one of the microprocessors on the given node until after the task is completed.

8. The method of claim 1, wherein the thermally conducting of the heat away from at least one of the plurality of nodes under the first mode in response to the temperature reading exceeding the first temperature threshold is by directing a liquid coolant through coils.

9. The method of claim 8, wherein the thermally conducting of the heat away from at least one of the plurality of nodes under the second mode in response to the temperature reading exceeding the second temperature threshold is by directing a liquid coolant through particular coils and spraying water onto exterior surfaces of the particular coils.

10. The method of claim 8, wherein the thermally conducting of the heat away from at least one of the plurality of nodes under the second mode in response to the temperature reading exceeding the second temperature threshold is by directing a liquid coolant through particular coils and passing the particular coils through a refrigerant.

11. The method of claim 1, wherein the thermally conducting of the heat away from at least one of the plurality of nodes under the first mode in response to the temperature reading exceeding the first temperature threshold is by directing a liquid coolant through coils and spraying water onto exterior surfaces of the coils.

12. The method of claim 11, wherein the thermally conducting of the heat away from at least one of the plurality of nodes under the second mode in response to the temperature reading exceeding the second temperature threshold is by directing a liquid coolant through particular coils and passing the particular coils through a refrigerant.

13. The method of claim 1 further comprising taking multiple temperature readings over time of the at least one of the nodes and automatically controlling the processing speed of the at least one of the microprocessors on at least one of the plurality of nodes based upon the multiple temperature readings.

14. The method of claim 1 wherein the high performance computing system is within a room having an air temperature, an environment comprising a region of the room, the temperature reading being the air temperature at the region of the room.

15. The method of claim 1 further comprising acquiring the temperature reading by monitoring a respective temperature of both (a) an environment of the high performance computing system and (b) at least a portion of the high performance computing system.

16. The method of claim 15, wherein reducing the processing speed of at least one of the microprocessors on at least one of the plurality of nodes is a function of both the monitored temperatures (a) and (b).

17. The method of claim 1 wherein the reducing of the processing speed of the at least one microprocessor is for a prescribed period of time, the method further comprising increasing the speed of the at least one microprocessor after the prescribed period of time has elapsed.

18. The method of claim 1 wherein the reducing of the processing speed of the at least one microprocessor occurs at least until the temperature reading decreases to a prescribed temperature, the method further comprising increasing the processing speed of the at least one microprocessor after the temperature reading has decreased to the prescribed temperature.

* * * * *